(12) United States Patent
Kreth (10) Patent No.: US 11,718,250 B2
(45) Date of Patent: Aug. 8, 2023

(54) TRANSPORTATION VEHICLE ELECTRICAL SYSTEM, METHOD FOR OPERATING A TRANSPORTATION VEHICLE ELECTRICAL SYSTEM, AND SAFETY DEVICE FOR A TRANSPORTATION VEHICLE ELECTRICAL SYSTEM

(71) Applicant: VOLKSWAGEN AKTIENGESELLSCHAFT, Wolfsburg (DE)

(72) Inventor: Adrian Kreth, Hannover (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/425,998

(22) Filed: May 30, 2019

(65) Prior Publication Data

US 2019/0366958 A1 Dec. 5, 2019

(30) Foreign Application Priority Data

Jun. 4, 2018 (DE) ..................... 10 2018 208 754.7

(51) Int. Cl.
*B60R 16/033* (2006.01)
*B60L 1/00* (2006.01)
(Continued)

(52) U.S. Cl.
CPC ............. *B60R 16/033* (2013.01); *B60L 1/00* (2013.01); *H02H 7/18* (2013.01); *H02H 7/20* (2013.01)

(58) Field of Classification Search
CPC ........... B60R 16/033; B60L 1/00; H02H 7/18; H02H 7/20
(Continued)

(56) References Cited

U.S. PATENT DOCUMENTS

2007/0102998 A1\* 5/2007 Jordan ................ B60R 16/0315
307/9.1
2013/0257280 A1\* 10/2013 Myers .................... H05B 45/38
315/122
2018/0291857 A1\* 10/2018 Kinoshita ........... F02N 11/0866

FOREIGN PATENT DOCUMENTS

CN 106415975 A 2/2017
DE 3702517 A1 8/1988
(Continued)

OTHER PUBLICATIONS

Office Action for Korean Patent Application No. 10-2019-0065903; dated Aug. 25, 2020.
(Continued)

*Primary Examiner* — Daniel Kessie
*Assistant Examiner* — Dru M Parries
(74) *Attorney, Agent, or Firm* — Barnes & Thornburg, LLP (57) ABSTRACT

A transportation vehicle on-board power supply system, a method, and a fuse device. The transportation vehicle on-board power supply system includes a battery, consumers, a primary fuse and paths via which the primary fuse, is electrically coupled in series with each one of the consumers, wherein each path has at least one secondary fuse. The primary fuse and the secondary fuses are reversible fuses and a control device of the transportation vehicle on-board power supply system accesses the fuses. The control device determines whether a fault has arisen in the transportation vehicle on-board power supply system, the fault satisfying a triggering criterion at least for one of the fuses having at least two of the paths, and selectively actuates the fuses so the fault-free paths are identified and the fuses in the fault-free paths are switched on again.

18 Claims, 2 Drawing Sheets

(51) Int. Cl.
  *H02H 7/18*   (2006.01)
  *H02H 7/20*   (2006.01)
(58) Field of Classification Search
  USPC .......................................................... 307/9.1
  See application file for complete search history.

(56) References Cited

FOREIGN PATENT DOCUMENTS

| DE | 10237549 A1 | 3/2004 |
|---|---|---|
| DE | 102006038263 A1 | 5/2007 |
| DE | 102009007969 A1 | 8/2010 |
| DE | 102009019825 A1 | 11/2010 |
| DE | 102015002070 A1 | 8/2016 |
| DE | 102015002149 A1 | 8/2016 |
| DE | 102015105426 A1 | 10/2016 |
| DE | 102015208777 A1 | 11/2016 |
| GB | 2182812 A | 5/1987 |
| JP | 2016060426 A | 4/2016 |

OTHER PUBLICATIONS

UK Patent Application No. GB8525378; Filed Oct. 15, 1985; Publication No. GB2182812A; Published May 20, 1987.
Office Action; Chinese Patent Application No. 201910480198.0; dated Aug. 3, 2022.

* cited by examiner

TRANSPORTATION VEHICLE ELECTRICAL SYSTEM, METHOD FOR OPERATING A TRANSPORTATION VEHICLE ELECTRICAL SYSTEM, AND SAFETY DEVICE FOR A TRANSPORTATION VEHICLE ELECTRICAL SYSTEM

PRIORITY CLAIM

This patent application claims priority to German Patent Application No. 10 2018 208 754.7, filed 4 Jun. 2018, the disclosure of which is incorporated herein by reference in its entirety.

SUMMARY

Illustrative embodiments relate to a transportation vehicle on-board power supply system, comprising a battery, a plurality of consumers, a primary fuse and a plurality of paths via which the primary fuse, which is electrically coupled to the battery, is electrically coupled in series with each one of the consumers, wherein each path comprises at least one of a plurality of secondary fuses; to a method for operating such a transportation vehicle on-board power supply system; and to a fuse device for such a transportation vehicle on-board power supply system.

BRIEF DESCRIPTION OF THE DRAWINGS

The exemplary embodiments will be described in more detail relative to the drawings, in which.

DETAILED DESCRIPTION

According to the international standard ISO 8820-2, fuse paths have to possess selectivity. This means that a fuse arranged relatively close to a location of a fault in an electrical circuit should trigger on account of the fault and the consumers of the other fuse paths of the circuit should continue to be supplied with energy.

DE 10 2015 002 070 A1 describes a battery cell for a battery of a transportation vehicle that can be transferred by a control unit to a switching state in which an electrical line between the galvanic element of the battery and an electrical connection is interrupted. Using the corresponding switching element of the battery cell, multiple triggering of the switching element is possible, that is to say the interruption of the electrically conductive connection within the battery is reversible. In this case, for example, the switching element itself is designed as a semiconductor element and arranged within the battery cell.

DE 10 2015 002 149 A1 likewise describes a battery cell for a battery of a transportation vehicle that likewise comprises a switching element, which is designed to interrupt and establish an electrically conductive connection between the galvanic element of the battery cell and an electrical connection of the battery cell. The battery cell is designed so that the electrically conductive connection within the battery can be reliably isolated in the event of a short circuit. However, the battery cell can be automatically released or automatically disconnected at excessively high temperatures for the purpose of protection.

DE 10 2009 007 969 A1 describes a short-circuit protection device for limiting or for disconnection a short-circuit current in a high-energy DC grid. The protection device comprises, inter alia, a monitoring and control device for monitoring the current through a switch and for opening the switch of the protection device when the current through the switch exceeds a prescribed limit value. The short-circuit protection device can in this case be integrated into a high-power battery installation having a plurality of parallel-connected battery modules, of which each individual battery module has its own protection device.

The generic DE 37 02 517 A1 shows a circuit arrangement for supplying power to a multiplicity of consumers connected to the same voltage source. For each consumer, an operating state switch arranged between the consumer and the voltage source is provided. Moreover, the circuit arrangement comprises a safety device, which can prevent damage upon the occurrence of an overcurrent or an undervoltage.

GB 2 182 812 A shows a circuit arrangement having a central rapid-switching semiconductor switch, wherein the circuit arrangement comprises a plurality of sub-circuits, which each have an individual switch and an interference detector. When an instance of interference is detected in one of the sub-circuits, the supply of energy to all of the sub-circuits is interrupted by the semiconductor switch, the sub-circuit affected by the interference is isolated and subsequently the supply of energy to the rest of the sub-circuits is re-established by the semiconductor switch.

A transportation vehicle designed for autonomous driving and having a lithium-ion battery generally has a rapidly disconnectable fuse for the battery. In the case of a technical defect in a consumer of such a transportation vehicle, the rapidly disconnectable fuse of the lithium-ion battery would be triggered. In this case, the entire transportation vehicle on-board power supply system would generally be disconnected immediately. In this situation, no selectivity of the fuse paths of the transportation vehicle on-board power supply system is thus guaranteed.

Disclosed embodiments provide a solution by which a generic transportation vehicle on-board power supply system with selective fuse paths can be operated.

This is achieved by a transportation vehicle on-board power supply system, a method for operating such a transportation vehicle on-board power supply system and a fuse device for such a transportation vehicle on-board power supply system in accordance with the independent patent claims.

The disclosed transportation vehicle on-board power supply system comprises a battery, a plurality of consumers, a primary fuse and a plurality of paths via which the primary fuse, which is electrically coupled to the battery, is electrically coupled in series with each one of the consumers, wherein each path comprises at least one of a plurality of secondary fuses. The primary fuse and the secondary fuses of the transportation vehicle on-board power supply system are designed as reversible fuses. In addition, a control device of the transportation vehicle on-board power supply system is configured to access the fuses to determine whether a fault has arisen in the transportation vehicle on-board power supply system, the fault satisfying a triggering criterion at least for one of the fuses comprised by at least two of the paths, and, in this case, to selectively actuate the fuses in such a way that the fault-free paths are identified and the fuses in the fault-free paths are subsequently switched on again.

In the disclosed transportation vehicle on-board power supply system, a battery of the transportation vehicle, which is, for example, a lithium-ion battery, is thus electrically coupled to the individual consumers of the transportation vehicle. The transportation vehicle on-board power supply system also has a plurality of fuses, which are each designed as reversible fuses. The reversible fuses are, for example, electronic fuses, which can be actuated in each case individually, that is to say selectively, by a central control unit of the control device of the transportation vehicle on-board power supply system.

Relating to the fuses of the transportation vehicle on-board power supply system, two groups of fuses are distinguished. On the one hand, what is known as the primary fuse is located directly behind the battery in a series electrical coupling. As an alternative thereto, the primary fuse may be a fuse that is integrated, for example, into the lithium-ion battery of the transportation vehicle, that is to say a self-protection fuse of the battery. The primary fuse in turn is electrically coupled to each one of the consumers of the transportation vehicle via a plurality of paths, which each comprise at least one of a plurality of what are known as secondary fuses. Each consumer of the transportation vehicle, such as, for example, an air-conditioning installation, an illumination device or a seat-heating system of the transportation vehicle, is thus coupled to at least one of the secondary fuses, the primary fuse and the battery of the transportation vehicle via one of the paths of the transportation vehicle on-board power supply system. The individual consumers are thus each located at the end of a series circuit composed of at least one of the secondary fuses, the primary fuse and battery. However, a plurality of consumers may also be connected to a secondary fuses.

In the case of a fault arising, such as, for example, a defect in one of the consumers or a case of overloading in the transportation vehicle on-board power supply system or in one of the consumers, the result may be the entire transportation vehicle on-board power supply system or at least a part of the transportation vehicle on-board power supply system being disconnected on account of a relatively slow reaction response of the individual fuses, that is to say the primary fuse and the secondary fuses. Such an at least partial disconnection of the transportation vehicle on-board power supply system results whenever at least one of the fuses is triggered, the at least one fuse being a constituent part of at least two paths between the battery and the individual consumers of the transportation vehicle. In the case of such a fault in the transportation vehicle on-board power supply system that satisfies what is known as the triggering criterion for individual fuses of the transportation vehicle on-board power supply system, the result is therefore at least partial disconnection of the transportation vehicle on-board power supply system.

However, the control device of the transportation vehicle on-board power supply system is configured to selectively actuate the individual fuses and to selectively check the individual paths in such a situation ultimately to identify the paths in which a fault is present. This can be effected, for example, by virtue of initially all of the fuses in the paths comprising the triggered fuse being switched off. In the context of the checking, the fuses of a first of the paths is subsequently switched on again. If the path is identified as fault-free, the fuses are switched off again, however. Subsequently, the fuses of the other paths are checked analogously thereto. As an alternative, this process can be carried out with all of the paths and not only with the paths comprising the triggered fuse. All of the paths identified as fault-free are switched on again as soon as at least the paths affected by the triggering of the fuse have been checked with respect to the fault that led to the triggering criterion being satisfied. As an alternative, after the described renewed switch-on strategy has been carried out, the transportation vehicle on-board power supply system can be switched on again successively, that is to say by virtue of the corresponding fuses being switched on one after another. By what is known as logging into the fault in the transportation vehicle on-board power supply system effected within the context of checking the individual paths, the exact location of the fault can be identified and the affected paths can be located and isolated from the rest of the transportation vehicle on-board power supply system, with the result that ultimately the consumers not affected by the fault can continue to be supplied with energy from the battery.

In contrast to transportation vehicle on-board power supply systems in which, for example, fusible links are provided to protect the transportation vehicle on-board power supply system in the event of overloading of the transportation vehicle on-board power supply system or individual consumers, the transportation vehicle on-board power supply system is protected with the aid of fuses that can be switched on again. This makes possible a situation in which, when at least one fuse comprising a plurality of the paths of the transportation vehicle on-board power supply system has been triggered, all of the fault-free paths can be identified and the fuses in these paths can subsequently be switched on again through selective actuation of the individual fuses, that is to say the selective switching on and off thereof. The selectivity in the fuse paths in transportation vehicle on-board power supply systems can therefore be satisfied with the aid of the described transportation vehicle on-board power supply system. In addition, after a fault that has satisfied the triggering criterion has arisen, the faulty path can be identified using the transportation vehicle on-board power supply systems in a relatively prompt and reliable manner, which is beneficial when eliminating the fault within the transportation vehicle on-board power supply system. In addition, the non-faulty parts of the transportation vehicle on-board power supply system can be operated again promptly after the fault event since the fuses in the fault-free paths can be switched on again.

Provision is made for the secondary fuses to be arranged in a plurality of fuse layers, which each comprise a plurality of parallel-connected secondary fuses, in such a way that individual secondary fuses in one of the fuse layers are electrically coupled in series with a plurality of secondary fuses of another fuse layer and are therefore comprised by a plurality of the paths. It is thus possible that a plurality of layers of secondary fuses for protecting the transportation vehicle on-board power supply system are present in the transportation vehicle on-board power supply system, the layers each consisting of a plurality of parallel-connected secondary fuses. For example, a first fuse layer has three secondary fuses, which are each electrically coupled to the primary fuse. The three secondary fuses are also each electrically coupled to three secondary fuses of a second fuse layer. The second fuse layer thus comprises a total of nine secondary fuses, which are each coupled in turn to at least one of the consumers of the transportation vehicle. This produces three branches of the paths, which each comprise four secondary fuses, one from the first fuse layer and three from the second fuse layer. If the triggering criterion is satisfied, often only one individual branch of the paths of the transportation vehicle on-board power supply system therefore fails, the paths of which are subsequently checked. Only if a triggering of the primary fuse itself results are all branches consisting of all individual paths of the transportation vehicle on-board power supply system switched off, with the result that the entire transportation vehicle on-board power supply system, that is to say all paths, have to be examined to be subsequently able to switch on the fuses in the fault-free paths again. This arrangement of the secondary fuses therefore makes it possible to check the paths in a targeted manner to identify the fault-free paths.

Provision is also made for the control device to be configured, for the purpose of identifying the fault-free paths, to individually check only the paths having the at least one fuse that has satisfied the triggering criterion in a prescribed order and to subsequently switch on the fuses of all the fault-free paths identified in the process again. It is thus possible to carry out successive checking of the paths. In this case, the individual paths are checked in the prescribed order, which is stipulated, for example, depending on a relevance of the individual consumers of the transportation vehicle on-board power supply system with respect to safety of transportation vehicle passengers, for example, through switching individual fuses on and off in a targeted manner. By taking into account the prescribed order, a useful checking and subsequent switch-on of the fuses of the fault-free paths is therefore possible. In addition, the fuses in the paths identified as fault-free can also be switched on simultaneously or one after the other in the prescribed order.

As an alternative embodiment, provision is made for the control device to be configured, for the purpose of identifying the fault-free paths, to individually check only the paths having the at least one fuse for which the triggering criterion is satisfied in a prescribed order and, as soon as a path having the at least one fuse for which the triggering criterion is satisfied has been identified, to switch on the fuses of all the other paths. The fault-free paths can therefore also be identified in a shortened form. This makes provision, for example, for initially all of the fuses to be switched off and, as soon as a path comprising a fuse for which the triggering criterion is satisfied has been identified through selective switching-on and switching-off, the path is assumed to be the source of the fault and the checking of the individual paths is subsequently terminated. All of the other paths, both those that have already been identified as fault-free and those that have not yet been checked, are subsequently switched on again. Therefore, it is possible for the fault-free paths to be identified in a rapid manner. In this case, it is assumed that often an actual fault is present only in one of the paths, on account of the electrical coupling of the fuses to one another, however, that is to say by virtue of the fact that often a plurality of paths of the transportation vehicle on-board power supply system comprise a fuse, a plurality of paths are switched off on account of the fault and of the triggered fuse. An alternative rapid procedure for identifying the fault-free paths can be derived from a "quick-sort" algorithm, an algorithm that is often used in the field of information technology for sorting numbers. That is to say it is not always only fuses in a single path that are switched on and off selectively.

In a further disclosed embodiment, provision is made for the control device to be designed to assume the triggering criterion as satisfied when a prescribed maximum power, a prescribed maximum current and/or a prescribed maximum voltage in one of the secondary fuses and/or the primary fuse is exceeded and triggers the primary fuse. The triggering criterion is therefore satisfied, for example, in the case of overloading in the transportation vehicle on-board power supply system or in one of the consumers. For example, a short circuit with respect to ground in the transportation vehicle on-board power supply system or in the consumer may occur. On account of the relatively high currents and/or voltages associated therewith, that is to say on account of the increased load in the transportation vehicle on-board power supply system associated therewith, corresponding prescribed maximum values may be exceeded when individual fuses in the transportation vehicle on-board power supply system are triggered. As soon as a fuse comprised by at least two of the paths of the transportation vehicle on-board power supply system satisfies the mentioned triggering criterion, the selective actuation comprising the switch-on and switch-off of individual fuses to identify the fault-free paths and the subsequent switch-on of the identified fault-free paths is carried out by the control device. Therefore, maximum values with respect to the current, the voltage and the power in the individual paths of the transportation vehicle on-board power supply system are available to the control device, the maximum values being dimensioned in such a way that the consumers and other components of the transportation vehicle on-board power supply system are protected against defects caused by an excessive loading owing to currents, voltages and powers.

In a further disclosed embodiment, provision is made for the control device to have a storage unit, which is configured to store which of the paths has been identified as fault-free and to take this information into account for switching on the fuses. The control device therefore records the information about the paths that have already been examined in the context of the identification of the fault-free paths in a unit provided for this purpose, what is known as the storage unit. Therefore, information about which path is faulty or not faulty is therefore available in the storage unit. Based on the fault states of the individual paths stored there, in the next operation, when the fuses of the fault-free paths are switched on again, it is ensured that only the actually fault-free paths are switched on again. With the aid of storing this information, a situation therefore arises in which, when paths of the transportation vehicle on-board power supply system are switched on again, a renewed triggering of the fuses on account of the same fault in the transportation vehicle on-board power supply system does not occur.

In a further disclosed embodiment, provision is made for the primary fuse and the secondary fuses to be designed as an electronic fuses and/or electronic fused load disconnectors. The fuses of the transportation vehicle on-board power supply system can therefore be, for example, protective devices that automatically disconnect a circuit in the case of a short-circuit or overloading and constitutes a form of overcurrent protection device, that is to say what are known as electronic fuses. In addition or as an alternative thereto, the fuses may also be what are known as load disconnectors, that is to say switches consisting of a combination of in each case one load break switch and one disconnector. In addition or as an alternative thereto, the electronic fuse may also be a relay. When selecting the fuse for the primary fuse and the secondary fuses, however, it should be taken into account, in particular, that the fuse is reversible, that is to say can be switched on and off again. As a result, it is possible to identify and subsequently switch on fault-free paths again by selectively switching on and off the individual fuses.

In a further disclosed embodiment, provision is made for the battery of the transportation vehicle on-board power supply system to be designed as a high-voltage battery, in particular, as a lithium-ion battery. As an alternative thereto, the transportation vehicle on-board power supply system can also comprise a lead-acid battery, as is often installed in transportation vehicles, or generally a battery that is designed for a low-voltage range of typically twelve volts. Often, however, lithium-ion batteries are found in transportation vehicles designed, in particular, for autonomous driving, inter-alia since these satisfy a higher safety level than conventional lead-acid batteries, such as, for example, a higher ISO 26262 (road vehicle—functional safety) standard. A lithium-ion battery has a high specific energy in comparison to other types of battery. However, in most applications, this requires electronic protective circuits, since lithium-ion batteries react in a sensitive manner both to deep discharging and to overcharging. The described transportation vehicle on-board power supply system therefore comprises a lithium-ion battery, since the described plurality of fuses, the primary fuse and a plurality of secondary fuses, are present in such a transportation vehicle on-board power supply system. In such a motor vehicle on-board power supply system having a plurality of paths, selective actuation of the individual fuses to identify the fault-free paths in the case of a fault within the transportation vehicle on-board power supply system may be expedient for satisfying the ISO 8820-2 regulations.

The benefits presented in connection with the embodiment transportation vehicle on-board power supply system accordingly hold true, if applicable, to a disclosed method for operating a transportation vehicle on-board power supply system. The method is therefore provided for a transportation vehicle on-board power supply system comprising a battery, a plurality of consumers, a primary fuse, a plurality of paths via which the primary fuse, which is electrically coupled to the battery, is coupled in series with in each case one consumer, wherein here the path comprises at least one of a plurality of secondary fuses, and a control device, which is configured to access the primary fuse designed as reversible fuse and the secondary fuses. The secondary fuses are arranged in a plurality of fuse layers, which each comprise a plurality of parallel-connected secondary fuses, in such a way that individual secondary fuses in one of the fuse layers are electrically coupled in series with a plurality of secondary fuses of another fuse layer and are therefore comprised by a plurality of the paths. The method comprises the following operations of the control device: It is determined whether a fault has arisen in the transportation vehicle on-board power supply system, the fault satisfying a triggering criterion at least for one of the fuses comprised by at least two of the paths. If the triggering criterion is satisfied for at least one fuse, the fuses are actuated selectively to identify the faulty paths, wherein only the paths having the at least one fuse for which the triggering criterion is satisfied are individually checked in a prescribed order. The fuses of all the fault-free paths identified in the process are subsequently switched on. As an alternative thereto, the fuses of all the other paths are switched on as soon as a path having the at least one fuse for which the triggering criterion is satisfied has been identified. The method is therefore designed for operating the transportation vehicle on-board power supply system described above. The control device that accesses the individual fuses, that is to say the primary fuse and the plurality of secondary fuses, identifies that a fault has arisen in the on-board power supply system, subsequently selectively actuates individual fuses by targeted switching-on and switching-off to identify the paths of the transportation vehicle on-board power supply system not affected by the fault and finally, after the check is terminated, switches the fuse of the fault-free path on again. By way of the disclosed method, the still functional part of the transportation vehicle on-board power supply system, that is to say consumers of the transportation vehicle not affected by the fault, is therefore switched on again.

According to the disclosed embodiments, a fuse device is also provided for a transportation vehicle on-board power supply system, as has been described above. The benefits presented in connection with the transportation vehicle on-board power supply system accordingly hold true, if applicable, to the disclosed fuse device. The control device comprises at least the plurality of paths via which the primary fuse, which is electrically coupled to the battery, of the transportation vehicle on-board power supply system is electrically coupled in series with each one of the consumers of the transportation vehicle, wherein each path comprises at least one of a plurality of secondary fuses, and the control device of the transportation vehicle on-board power supply system. The secondary fuses are arranged in a plurality of fuse layers, which each comprise a plurality of parallel-connected secondary fuses, in such a way that individual secondary fuses in one of the fuse layers are electrically coupled in series with a plurality of secondary fuses of another fuse layer and are therefore comprised by a plurality of the paths. The control device of the transportation vehicle on-board power supply system is, for example, a microcontroller, in which the various operations of the method described above are recorded as corresponding control demands. The secondary fuses in the paths of the fuse device are reversible fuses, such as, for example, electronic fuses and/or electronic fused load disconnectors. The fuse device also has an interface via which it can access the primary fuse, which is arranged outside of the fuse device. As an alternative thereto, the primary fuse, if it not integrated into the battery, for example, can also be a constituent part of the fuse device. The disclosed fuse device can therefore be integrated into a transportation vehicle on-board power supply system to protect a battery of a transportation vehicle and to ensure selectivity in fuse paths in such a transportation vehicle on-board power supply system.

The disclosed embodiments provide a method which have features as have already been described in connection with the disclosed transportation vehicle. For this reason, the corresponding embodiments of the disclosed method are not described again here.

In the exemplary embodiment, the described components of the embodiment constitute in each case individual features that are to be considered independently of one another and that each also develop independently of one another. Therefore, the disclosure is also intended to comprise other combinations of the features of the embodiments than those illustrated in the exemplary embodiment. Furthermore, the described embodiment can also be supplemented by further features of the disclosed embodiments that have already been described.

In the figures, functionally identical elements are provided in each case with the same reference signs.

Figure 1:
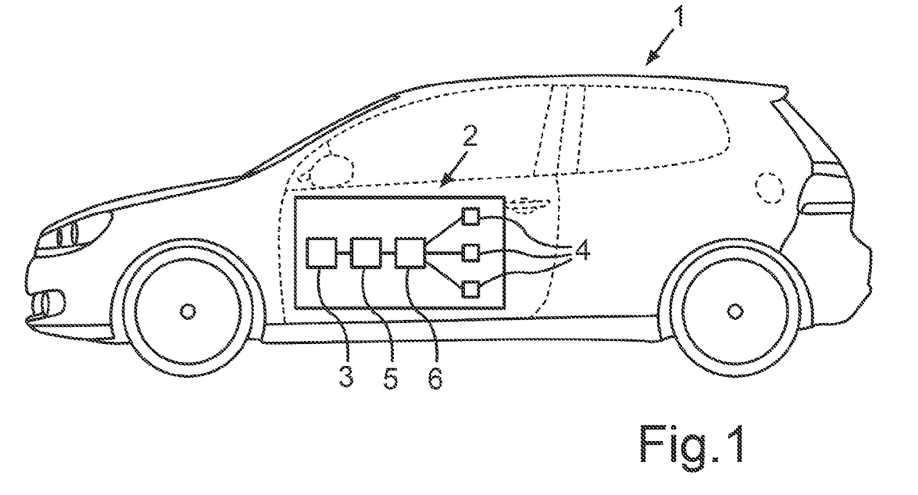
FIG. 1 shows a schematic illustration of a transportation vehicle having a transportation vehicle on-board power supply system.

FIG. 1 outlines a transportation vehicle 1, which comprises a transportation vehicle on-board power supply system 2. The transportation vehicle on-board power supply system 2 comprises a battery 3, and a plurality of consumers 4, such as, for example, an air-conditioning installation, a seat-heating system and a radio system. The consumers 4 are supplied with electrical energy, inter alia, by the battery 3. A primary fuse 5 and a fuse device 6 are integrated into the transportation vehicle on-board power supply system 2 between the battery 3 and the individual consumers 4, specifically into the individual supply paths of the consumers 4. The primary fuse 5 is, for example, a fuse, such as a self-protection system of the battery 3, which is integrated into the battery 3. The battery 3 itself is designed, for example, as a lithium-ion battery, in particular, as a high-voltage battery for the transportation vehicle 1. The transportation vehicle 1 may be designed for autonomous driving. In such transportation vehicles 1, which are designed, inter alia, for fully autonomous driving without a driver, an on-board power supply system, such as the transportation vehicle on-board power supply system 2 equipped with a plurality of fuse components, the primary fuse 5 and the additional fuse device 6 is expedient.

Figure 2:
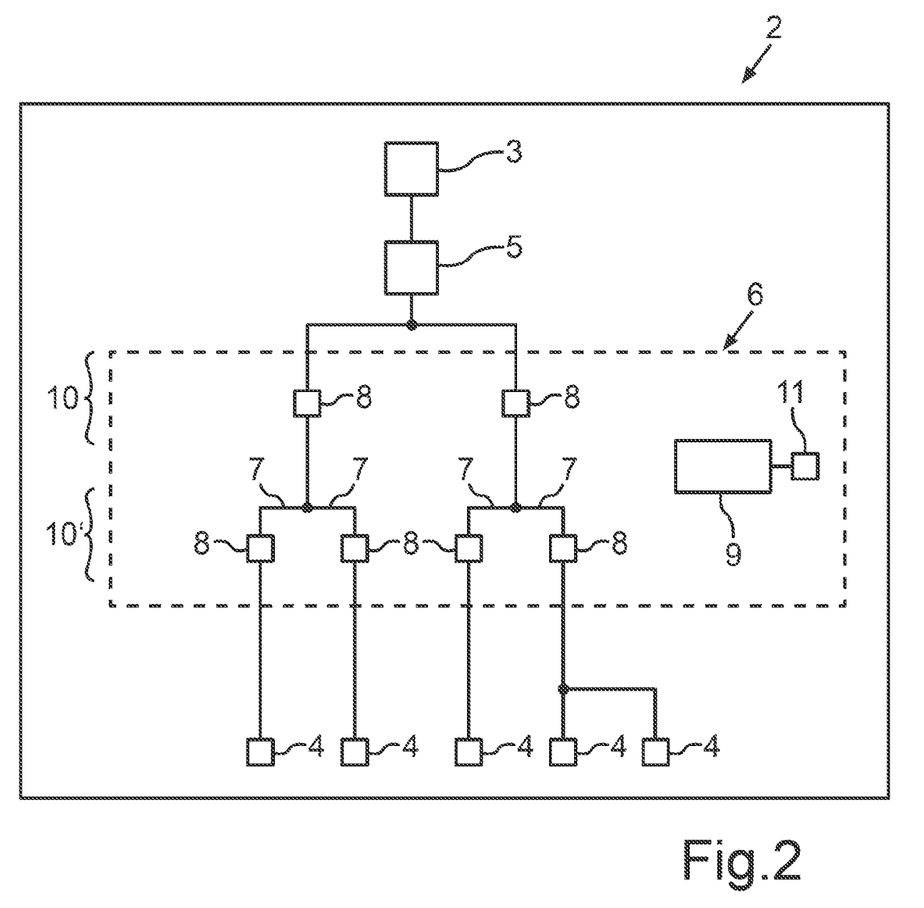
FIG. 2 shows a schematic illustration of a transportation vehicle on-board power supply system.

FIG. 2 outlines the transportation vehicle on-board power supply system 2 in more detail. The fuse device 6 of the transportation vehicle on-board power supply system 2 comprises a plurality of components. On the one hand, the fuse device comprises a plurality of paths 7 via which the primary fuse 5, which is electrically coupled to the battery 3, is electrically coupled in series with each one of the consumers 4, wherein each of the paths 7 comprises at least one of a plurality of secondary fuses 8. Both the primary fuse 5 and the secondary fuses 8 are designed as reversible fuses, for example, as electronic fuses or as electronic fused load disconnectors, and can be switched on and off by a control device 9 of the transportation vehicle on-board power supply system 2. The corresponding communication connections for data exchange between the primary fuse 5 and/or the secondary fuses 8 and the control device 9 are not outlined in FIG. 2.

In this case, the secondary fuses 8 can be arranged in a plurality of fuse layers 10, 10'. Each of the fuse layers 10, 10' comprises a plurality of parallel-connected secondary fuses 8. In this case, the secondary fuses 8 are arranged in such a way that individual secondary fuses 8 in the fuse layer 10 are electrically coupled in series with a plurality of secondary fuses 8 of the fuse layer 10' and are therefore comprised by a plurality of the paths 7. The two secondary fuses 8 in the fuse layer 10 are electrically coupled in series here with in each case two secondary fuses 8 of the fuse layer 10'. The total of six secondary fuses 8 of the fuse device 6 are thus distributed over two fuse layers 10, 10' so that a total of two branches of paths 7 can be distinguished, in each case one per secondary fuse 8 of the fuse layer 10, wherein each branch comprises at least two of the consumers 4. It is possible for the paths 7 of a plurality of consumers 4 to comprise the same secondary fuses 8, that is to say a plurality of consumers 4 are electrically coupled in series with in each case a secondary fuse 8 of the fuse layer 10'.

As an alternative to the outlined fuse device 6, the fuse device 6 in the transportation vehicle 1 can be physically distributed, for example, by a plurality of fuse distributors distributed in the transportation vehicle 1 and the control device 9 arranged physically separately. This produces fuse layers 10, 10' that are physically distributed in the transportation vehicle, The control device 9 is, for example, a microcontroller, which also has a storage unit 11, in which information regarding the individual paths 7 can be stored.

Figure 3:
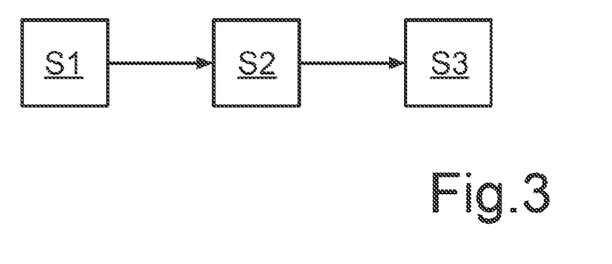
FIG. 3 shows a schematic illustration of a signal flow diagram for a method for operating a transportation vehicle on-board power supply system.

FIG. 3 shows the individual method operations that are carried out within the scope of the method for operating the transportation vehicle on-board power supply system 2. In a first operation at S1, the control device 9 first determines whether a fault has arisen in the transportation vehicle on-board power supply system 2, the fault satisfying a triggering criterion at least for one of the fuses comprised by at least two of the paths 7. The triggering criterion is, for example, a prescribed maximum power, a prescribed maximum current or a prescribed maximum voltage. As soon as the maximum value stipulated in this way is exceeded in one of the secondary fuses 8 or in the primary fuse 5, the corresponding fuse is triggered. If the triggered fuse is one of the secondary fuses 8 respectively comprised by a plurality of paths 7 or the primary fuse 5, a plurality of consumers 4 are switched off and therefore a plurality of paths 7 of the transportation vehicle on-board power supply system 2 are disconnected. However, since not all of the consumers 4 of the paths 7 affected in this way are actually faulty, in operation at S2, the individual fuses, that is to say the affected secondary fuses 8 and the primary fuse 5 are selectively actuated to identify all of the fault-free paths 7 of the transportation vehicle on-board power supply system 2. This can be effected, for example, by virtue of initially all of the fuses in the paths 7 comprising the triggered fuse being switched off. In the context of the checking, the fuses of a first of the paths 7 is subsequently switched on again. If the path 7 is identified as fault-free, the fuses are switched off again, however. Subsequently, the fuses of the other paths 7 are checked analogously thereto. As an alternative, this process can be carried out with all of the paths 7 and not only with the paths 7 comprising the triggered fuse. The identification of the fault-free paths 7 is effected in a prescribed order in which the fuses are switched on and off selectively by in each case one of the paths 7. The information obtained in the process via the examined paths 7 is recorded in the storage unit 11, that is to say which path 7 with which fuses is fault-free or faulty is recorded in the storage unit.

In a third operation at S3 of the method, the fuses in the paths 7 previously identified and recorded as fault-free are switched on. It is therefore an aim of the method to switch on as many paths 7 of the transportation vehicle on-board power supply system 2 again, that is to say the secondary fuses 8 in the paths 7 and the primary fuse 5 so that the greatest possible proportion of the transportation vehicle on-board power supply system 2, that is to say as many consumers 4 as possible, are functional again and are supplied with electrical energy from the battery 3. That is to say the paths 7 are checked successively and subsequently the fault-free part of the transportation vehicle on-board power supply system 2 is switched on.

As an alternative thereto, it is also possible that the checking of the paths 7 for the fault is already terminated as soon as a faulty path 7 has been identified. The fuse of the faulty path 7 is subsequently left switched-off whereas the fuses in all of the other paths 7 are switched on. Since in general a fault that has led to satisfaction of the triggering criterion is present only in one path 7, the described method for operating a transportation vehicle on-board power supply system 2 can therefore be carried out in a shortened time-saving manner. If, however, there are further paths 7 that are affected by the fault that satisfied the triggering criterion, the transportation vehicle on-board power supply system 2 or the affected part of the transportation vehicle on-board power supply system 2 fails again. If this should be the case, the fault-free paths 7 have to be checked and identified again.

Overall, the examples show that, after the occurrence of a fault in the transportation vehicle on-board power supply system 2 and the subsequent disconnection of at least part of the transportation vehicle on-board power supply system 2, the fuses designed as reversible fuses, the primary fuse 5 and the secondary fuses 8, in all of the paths 7 identified as fault-free are switched on again. For this purpose, in the context of identifying the fault-free paths 7, the fault is possibly logged into by virtue of the fuses of fault paths 7 first being switched off and then switched on again, the fuses then being triggered again. However, the exact location of the fault in the transportation vehicle on-board power supply system 2 can be identified as a result. After locating the fault in the transportation vehicle on-board power supply system 2, the fault path 7 can be isolated and the fuses of all of the fault-free paths 7 can be switched on again. All of the consumers 4 of the transportation vehicle 1 that are able to be used in a fault-free manner are thus finally supplied with electrical energy again.

LIST OF REFERENCE SYMBOLS

1 Transportation vehicle
2 Transportation vehicle on-board power supply system
3 Battery
4 Consumer
5 Primary fuse
6 Fuse device
7 Path
8 Secondary fuse
9 Control device
10, 10' Fuse layer
11 Storage unit
S1, S2, S3 Operations

The invention claimed is:

1. A transportation vehicle on-board power supply system including a plurality of paths with fuse path selectivity whereby fuse triggering relative to an electrical circuit fault location on one of the plurality of paths is performed selectively to enable continued power supply for consumers of other paths of the plurality of paths in the on-board power supply system, the power supply system comprising:
a battery;
a plurality of consumers;
a rapidly disconnectable single primary fuse electrically coupled to the battery;
a plurality of paths via which the single primary fuse is electrically coupled in series with each one of the consumers,
wherein each path of the plurality of paths comprises a plurality of secondary fuses,
wherein each path of the plurality of paths includes at least one branch,
wherein the single primary fuse and the secondary fuses are reversible fuses,
wherein the secondary fuses are arranged in a plurality of fuse layers each comprising a plurality of parallel-connected secondary fuses so that individual secondary fuses in one of the fuse layers are electrically coupled in series with a plurality of secondary fuses of another fuse layer,
wherein interconnection of the plurality of parallel-connected secondary fuses in the plurality of fuse layers is provided by the plurality of paths,
wherein a first fuse layer includes a plurality of secondary fuses that are each electrically coupled to the single primary fuse and electrically coupled to a plurality of secondary fuses contained in a second fuse layer, wherein the plurality of secondary fuses in the second fuse layer are coupled to at least one of the consumers of the transportation vehicle, whereby the plurality of paths includes a plurality of path branches each comprising a plurality of secondary fuses including secondary fuses in both the first fuse layer and the second fuse layer; and
a control device configured to access the single primary and plurality of secondary fuses to detect a fault,
wherein the control device is further configured to determine whether the fault satisfies a triggering criterion,
wherein, in response to the determination that the detected fault satisfies the triggering criterion, the control device conducts an assessment of the single primary and secondary fuses that individually checks only the paths of the plurality of paths that have satisfied the triggering criterion, wherein the individual checks include targeted switching-on and switching-off of only fuses on the paths that have satisfied the triggering criterion, wherein the targeted switching-on and switching-off are performed in a prescribed order to identify which paths of the transportation vehicle on-board power supply system are not affected by the detected fault as fault free paths,
wherein, based on the assessment, the control device switches on the fuses of all the fault-free paths to provide the fuse path selectivity, whereby the fuse triggering relative to the electrical circuit fault location is performed selectively to enable continuous power supply for consumers of other paths in the on-board power supply system, while the power supply for the electrical circuit fault location is selectively interrupted,
wherein only if a triggering of the single primary fuse is detected are all branches consisting of all of the plurality of paths of the transportation vehicle on-board power supply system switched off, and otherwise, the paths in the on-board power supply system identified as fault free paths remain connected to the battery following interruption of the power supply for the electrical circuit fault location to maintain fuse path selectivity.

2. The transportation vehicle on-board power supply system of claim 1, wherein the single primary fuse and the secondary fuses are electronic fuses and/or electronic fused load disconnectors.

3. The transportation vehicle on-board power supply system of claim 1, wherein the battery of the transportation vehicle on-board power supply system is a high-voltage battery.

4. The transportation vehicle on-board power supply system of claim 1, wherein the fuse path selectivity is performed according to international standard ISO 8820-2.

5. The transportation vehicle on-board power supply system of claim 1, wherein the battery is a lithium-ion battery.

6. The transportation vehicle on-board power supply system of claim 1, wherein the control device switches on the secondary fuses of all the other paths as soon as a path having the at least one secondary fuse for which the triggering criterion is satisfied has been identified, while the paths having satisfied the triggering criterion remain deactivated.

7. A method for operating a transportation vehicle on-board power supply system including a plurality of paths with fuse path selectivity whereby fuse triggering relative to an electrical circuit fault location on one of the plurality of paths is performed selectively to enable continued power supply for consumers of other paths of the plurality of paths in the on-board power supply system, the power supply system comprising:
a battery;
a plurality of consumers;

a rapidly disconnectable single primary fuse electrically coupled to the battery;
a plurality of secondary fuses designed as reversible fuses;
a plurality of paths via which the single primary fuse, is electrically coupled in series with each one of the consumers,
  wherein each path of the plurality of paths comprises a plurality of secondary fuses,
  wherein each path of the plurality of paths includes at least one branch,
  wherein the secondary fuses are arranged in a plurality of fuse layers each comprising a plurality of parallel-connected secondary fuses so that individual secondary fuses in one of the fuse layers are electrically coupled in series with a plurality of secondary fuses of another fuse layer wherein interconnection of the plurality of parallel-connected secondary fuses in the plurality of fuse layers is provided by the plurality of paths,
  wherein a first fuse layer includes a plurality of secondary fuses that are each electrically coupled to the single primary fuse and electrically coupled to a plurality of secondary fuses contained in a second fuse layer, wherein the plurality of secondary fuses in the second fuse layer are coupled to at least one of the consumers of the transportation vehicle, whereby the plurality of paths includes a plurality of path branches each comprising a plurality of secondary fuses including secondary fuses in both the first fuse layer and the second fuse layer; and
a control device configured to access the single primary fuse and the plurality of secondary fuses to detect a fault;
the method for operating the transportation vehicle on-board power supply system comprising the following operations of the control device;
  detecting the fault,
  determining whether the detected fault satisfies a triggering criterion,
  in response to the determination that the detected fault satisfies the triggering criterion, conducting an assessment of the single primary and secondary fuses that individually checks only the paths of the plurality of paths that have satisfied the triggering criterion, the assessment including selectively switching-on and switching-off of only fuses on the paths that have satisfied the triggering criterion, wherein the targeted switching-on and switching-off are performed in a prescribed order to identify which paths are not affected by the detected fault as fault free paths,
  based on the assessment, switching on the fuses of all the fault-free paths to provide the fuse path selectivity, whereby the fuse triggering relative to the electrical circuit fault location is performed selectively to enable continuous power supply for consumers of other paths in the on-board power supply system, while the power supply for the electrical circuit fault location is selectively interrupted,
  wherein only if a triggering of the single primary fuse is detected are all branches consisting of all of the plurality of paths of the transportation vehicle on-board power supply system switched off, and, otherwise, the paths in the on-board power supply system identified as fault free paths remain connected to the battery following interruption of the power supply for the electrical circuit fault location to maintain fuse path selectivity.

8. The method for operating of claim 7, wherein the single primary fuse and the secondary fuses are electronic fuses and/or electronic fused load disconnectors.

9. The method for operating of claim 7, wherein the battery of the transportation vehicle on-board power supply system is a high-voltage battery.

10. The method for operating of claim 7, wherein the selective actuation of the plurality of secondary fuses is performed according to international standard ISO 8820-2.

11. The method for operating of claim 7, wherein the battery is a lithium-ion battery.

12. The method of claim 7, further comprising switching on the secondary fuses of all the other paths as soon as a path having the at least one secondary fuse for which the triggering criterion is satisfied has been identified, while the paths having satisfied the triggering criterion remain deactivated.

13. A fuse arrangement for a transportation vehicle on-board power supply system including a plurality of paths with fuse path selectivity whereby fuse triggering relative to an electrical circuit fault location on one of the plurality of paths is performed selectively to enable continued power supply for consumers of other paths of the plurality of paths in the on-board power supply system, wherein the on-board power supply system includes a battery that provides power to a plurality of consumers, the fuse arrangement comprising:
a rapidly disconnectable single primary fuse electrically coupled to the battery;
a plurality of paths via which the single primary fuse is electrically coupled in series with each one of the consumers,
  wherein each path of the plurality of paths comprises a plurality of secondary fuses,
  wherein each path of the plurality of paths includes at least one branch,
  wherein the single primary fuse and the secondary fuses are reversible fuses,
  wherein the secondary fuses are arranged in a plurality of fuse layers each comprising a plurality of parallel-connected secondary fuses so that individual secondary fuses in one of the fuse layers are electrically coupled in series with a plurality of secondary fuses of another fuse layer,
  wherein interconnection of the plurality of parallel-connected secondary fuses in the plurality of fuse layers is provided by the plurality of paths,
  wherein a first fuse layer includes a plurality of secondary fuses that are each electrically coupled to the single primary fuse and electrically coupled to a plurality of secondary fuses contained in a second fuse layer, wherein the plurality of secondary fuses in the second fuse layer are coupled to at least one of the consumers of the transportation vehicle, whereby the plurality of paths includes a plurality of path branches each comprising a plurality of secondary fuses including secondary fuses in both the first fuse layer and the second fuse layer; and
a control device configured to access the single primary and plurality of secondary fuses to detect a fault,
  wherein the control device is further configured to determine whether the fault satisfies a triggering criterion,
  wherein, in response to the determination that the detected fault satisfies the triggering criterion, the control device conducts an assessment of the single primary and secondary fuses that individually checks only the paths of the plurality of paths that have satisfied the triggering criterion, wherein the individual checks include targeted switching-on and switching-off of only fuses on the paths that have satisfied the triggering criterion, wherein the targeted switching-on and switching-off are performed in a prescribed order to identify which paths of the transportation vehicle on-board power supply system are not affected by the detected fault as fault free paths, wherein, based on the assessment, the control device switches on the fuses of all the fault-free paths to provide the fuse path selectivity, whereby the fuse triggering relative to the electrical circuit fault location is performed selectively to enable continuous power supply for consumers of other paths in the on-board power supply system, while the power supply for the electrical circuit fault location is selectively interrupted, wherein only if a triggering of the single primary fuse is detected are all branches consisting of all of the plurality of paths of the transportation vehicle on-board power supply system switched off, and, otherwise, the paths in the on-board power supply system identified as fault free paths remain connected to the battery following interruption of the power supply for the electrical circuit fault location to maintain fuse path selectivity.

14. The fuse arrangement of claim 13, wherein the single primary fuse and the secondary fuses are electronic fuses and/or electronic fused load disconnectors.

15. The fuse arrangement of claim 13, wherein the battery of the transportation vehicle on-board power supply system is a high-voltage battery.

16. The fuse arrangement of claim 13, wherein the fuse path selectivity is performed according to international standard ISO 8820-2.

17. The fuse arrangement of claim 13, wherein the battery is a lithium-ion battery.

18. The fuse arrangement of claim 13, wherein the control device switches on the secondary fuses of all the other paths as soon as a path having the at least one secondary fuse for which the triggering criterion is satisfied has been identified, while the paths having satisfied the triggering criterion remain deactivated.

* * * * *